May 1, 1962 J. M. WALTER 3,031,896
TABLE DRIVING MECHANISM FOR MACHINE TOOLS
Filed Jan. 11, 1960 6 Sheets-Sheet 1

INVENTOR.
John M. Walter.
BY
Wood, Herron & Evans.
ATTORNEYS.

May 1, 1962 J. M. WALTER 3,031,896
TABLE DRIVING MECHANISM FOR MACHINE TOOLS
Filed Jan. 11, 1960 6 Sheets-Sheet 3

Fig. 3

INVENTOR.
John M. Walter.
BY
Wood, Herron & Evans
ATTORNEYS.

May 1, 1962 J. M. WALTER 3,031,896
TABLE DRIVING MECHANISM FOR MACHINE TOOLS
Filed Jan. 11, 1960 6 Sheets-Sheet 4

INVENTOR.
John M. Walter
BY Wood, Herron & Evans.
ATTORNEYS.

May 1, 1962 J. M. WALTER 3,031,896
TABLE DRIVING MECHANISM FOR MACHINE TOOLS
Filed Jan. 11, 1960 6 Sheets-Sheet 5

INVENTOR.
John M. Walter.
BY Wood, Herron & Evans.
ATTORNEYS.

United States Patent Office 3,031,896
Patented May 1, 1962

3,031,896
TABLE DRIVING MECHANISM FOR
MACHINE TOOLS
John M. Walter, Cincinnati, Ohio, assignor to The G. A. Gray Company, Cincinnati, Ohio, a corporation of Ohio
Filed Jan. 11, 1960, Ser. No. 1,698
12 Claims. (Cl. 74—410)

This invention relates to metal-working planers and similar machine tools, and is particularly directed to an improved driving mechanism for reciprocating the work-supporting table of the planer relative to the bed of the machine.

In general, the typical metal-working planer comprises a stationary bed having a work table which is reciprocated longitudinally by operation of a power driving system. The bed includes a column (at one or both sides) rising vertically above the table, and the column supports a cross rail which extends transversely across the table at an elevation above it. A saddle is slidably mounted upon the cross rail and a tool head is mounted on the saddle for stepwise feed advancements across the table. The cutting tool or tools are carried by the tool head in a position to be presented to the workpiece which is carried by the table.

During a single stroke planing operation, the cutting tool is presented to the surface of the workpiece as it is carried past the tool during the cutting stroke of the table, whereby a longitudinal cut is taken from the work surface. At the end of the cutting stroke, the single action tool is shifted to a non-cutting position and the table is reciprocated through its return stroke, while the tool is fed transversely to a position for a second cut. This action is repeated until a planed surface is produced, with the successive longitudinal cuts partially overlapping one another.

During a double cutting operation, a double cutting tool having two opposed cutting edges is mounted on the tool head which is arranged to shift the two cutting edges alternately to a cutting position. Thus, at the end of one cutting stroke, when the trailing end of the workpiece travels beyond one cutting edge, the tool head shifts the opposed edge to a cutting position, and feeds the tool head transversely, such that a cut is taken during reciprocation of the table, both in the forward and return directions.

The typical planing machine is provided with a reversible table motor which is in driving connection with the table through a speed reduction gear train. The table includes a rack mounted on its undersurface and meshing with a pinion, known in the industry as a "bull gear," which forms a part of the gear train. During the cutting stroke, whether in a single cutting or double cutting operation, a great deal of power must be transmitted to the table through the table driving system in order to overcome the resistance which is generated by the action of the cutting tool with respect to the workpiece. Moreover, impact forces of considerable magnitude are imposed upon the driving system upon reversal of the table at its limits of reciprocation.

The multiple gear speed reduction system of the conventional planer is relatively expensive and requires a considerable number of gears and bearings. Moreover, the several sets of reduction gears and bearings involve power losses through frictional resistance, requiring a relatively complex lubrication system for maintaining an oil film between all of the moving surfaces of the mechanism.

The prior patent to John M. Walter, No. 2,504,366 (Re. 23,331) discloses a simplified driving system which employs a power shaft extending through the bed at an acute angle to the longitudinal path of table travel. The outer end of this shaft passes from the bed in the angle between the column and bed into direct connection with the table motor which is located in an outboard position at the angle between the bed and column.

One of the primary objectives of the present invention has been to provide a simplified table driving system retaining the space saving advantages of the angulated power shaft arrangement noted above, wherein the axis of the bull gear is disposed at an acute angle to the path of travel of the table to provide high strength tooth geometry and smooth action between the bull gear and rack teeth.

Another objective has been to provide a table driving system which prevents side thrusts from acting upon the table during its reciprocating motion, thereby to preserve the table bearing surfaces from excessive wear.

Briefly, the present structure involves the use of an angulated power shaft and an outboard table motor coupled directly to the shaft and driving a worm and worm wheel transmission. The worm wheel is directly coupled to the bull gear which meshes with the table rack. In order to further simplify the structure, the worm, and the worm wheel and bull gear are rotatably journalled within a self-contained gear case which is mounted as a unit within the bed at a point intermediate its length. By reason of the self-contained structure, the bearing bores are more conveniently and accurately machined with the gear case separated from the bed, whereby the entire unit may be assembled then bolted in place on the bed.

A further objective of the invention has been to provide a worm and wheel driving system for the table, wherein the axial thrust which is imposed upon the worm wheel is counteracted by an axial thrust which acts upon the bull gear in the opposite direction, thereby to reduce end thrusts and frictional losses within the driving system.

As noted above, the bull gear shaft is disposed at an acute angle to the path of table motion and to the table rack, and the bull gear is provided with helical teeth which provide a smooth driving engagement with the rack teeth, which are also helical. The helix of the worm, the angular disposition of the bull gear shaft, and the helical teeth of the bull gear are so interrelated that axial thrusts, which act upon the worm wheel tending to shift the same along the shaft, are substantially counterbalanced by the turning resistance acting upon the gear during table motion. This arrangement also prevents side thrusts from acting upon the table as a consequence of the driving forces.

A further objective of the invention has been to provide an arrangement whereby the lubricating system serves the double function of applying lubricant to the ways or V bearing surfaces of the bed and table, and which takes advantage of the circulation of lubricant to dissipate heat from the table driving system.

According to this aspect, the lubricant system includes a motor-driven pump which draws oil from a sump, formed in the bed beneath the table drive unit, and forces the lubricant under pressure to the bed ways, where it lubricates the bearing surfaces then recirculates back to the sump. A portion of the oil under pressure is forced under pressure through the bull gear shaft to lubricate the plain bearing surfaces of the bull gear and to create a cushioning action with respect to impact forces. Another portion of the oil is transmitted under low pressure to the gear case which is provided with an overflow passageway, thereby to maintain an oil level in the lower portion of the gear case, submerging the worm and partially submerging the bull gear and worm wheel. Since oil flows continuously from the table and along the bed to its opposite ends before returning to the sump, the system takes advantage of the bed to air-cool the returning oil, which is then used as a coolant with respect to the gear case.

The present invention has been disclosed in relation to a worm gear set as a preferred embodiment. However, it is contemplated to utilize drives other than worm gearing where desired, for example, plain tooth bevel gears, spiral bevels or hypoids. In the use of bevel gears, the angle between the bull gear shaft and power shaft can be more or less than 90 degrees, according to the design of the gear set, so as to locate the drive motor in the most desirable position.

The various features features and advantages of the invention will be more fully apparent to those skilled in the art from the following detailed description taken in conjunction with the drawings.

*Planing Machine Generally*

Figure 1:
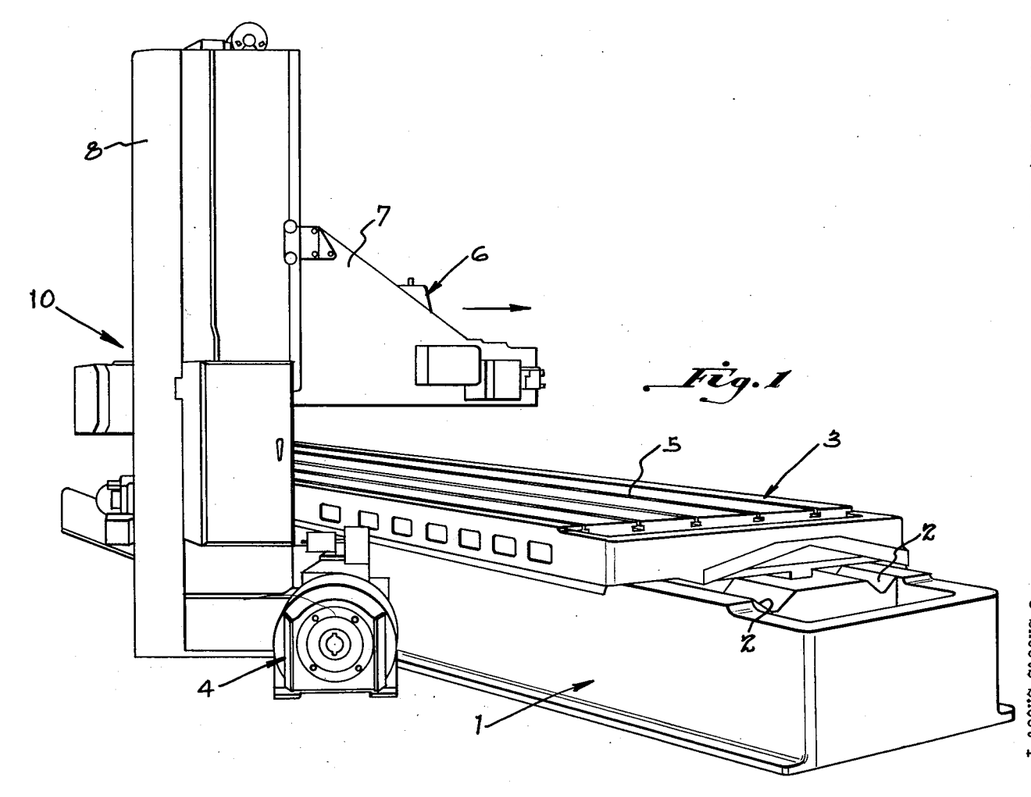
FIGURE 1 is a perspective view of an open side planer embodying the table drive mechanism of this invention, and showing the table drive motor with reference to the column and bed of the machine.

The machine illustrated in FIGURE 1 represents an open side planer which has been selected to illustrate the principles of the present invention. It will be understood that it is contemplated to utilize the invention in conjunction with planer type milling machines and with other machine tools of the type which include a reciprocating table arranged to advance a workpiece linearly with respect to a cutting tool.

In general, the planer illustrated in FIGURE 1 comprises a rigid bed 1 having ways or V bearings 2 extending longitudinally along its upper surface and slidably supporting a table 3 for longitudinal reciprocation with respect to the bed. The table is reciprocated by a reversible table motor, indicated generally at 4, which is in driving connection with the table drive unit of the invention, as described in detail later. During a planing operation, the workpiece is carried upon the upper surface of the table and is secured in position by appropriate clamping devices which are anchored in the T-slots 5, which extend longitudinally along the upper surface of the table. The cutting tool or tools (not shown), which are presented to the workpiece, are mounted upon a tool head, indicated generally at 6, which is slidably mounted upon a cross rail 7, which extends across the table. The cross rail 7 projects in cantilever fashion from a column 8 which rises from one side of the bed 1 of the machine.

In setting up the machine, the cross rail 7 may be adjusted vertically by a power motor (not shown) with respect to the column 8 to accommodate the workpiece; the cutting tool may also be adjusted vertically with respect to the tool head 6 to a precise cutting position. The cross rail is also provided with horizontal rail screw (not shown) in threaded engagement with the tool head for feeding the head, and its cutting tool, horizontally in stepwise fashion along the cross rail 7 and across the table.

During a surface planing operation, the motor 4, through the table driving system reciprocates the table longitudinally along the ways 2 of the bed so as to advance the workpiece longitudinally relative to the cutting tool, which is adjusted to present its cutting edge properly to the workpiece. When the trailing end of the workpiece travels beyond the cutting tool, the direction of rotation of the table motor 4 is reversed so as to shift the table in the opposite direction.

In a surface planing operation, the work surface is finished by means of successive parallel cuts which partially overlap one another. Ordinarily, at the start of the operation, the tool head is shifted toward the inner end of the rail at the operator's station, as indicated at 10 in FIGURE 1, and the cutting tool is adjusted downwardly relative to the work surface for the required cutting depth. The cutting strokes usually are started at the edge of the workpiece nearest the operator, the tool head being shifted through stepwise advancements from the column, one step after each cutting stroke, as indicated by the arrow. These feeding steps are imparted to the tool head through operation of the cross rail screw at the limit of table motion.

Modern planing machines may be arranged to provide either a single cutting action or a double cutting action. In a single cutting operation, the cutting tool is presented to the work surface during reciprocation of the table in one direction, the tool being shifted to a non-cutting position during the return stroke of the table. The feeding steps are imparted to the tool head usually during the non-cutting return stroke of the table. In a double cutting operation, the feeding steps are imparted to the tool head at both limits of reciprocation of the table when the trailing end of the workpiece passes beyond the cutting tool. In a double cutting operation, two cutting tools are utilized, the tools alternately being shifted to a cutting position at the limits of table motion, such that a cut is taken during forward and return table motion.

During the cutting stroke, particularly during rough cutting operations where a substantial amount of metal is removed during each stroke, a great deal of power must be applied to the table due to the resistance generated through the cutting action. On the other hand, for maximum efficiency, the table speeds of a modern planer are relatively high so as to remove a maximum amount of metal in a given period of time. During single action cutting, the table is reciprocated at a given cutting speed during the cutting stroke and usually is translated at a more rapid rate during the return, non-cutting stroke, so as to reduce idling time to a minimum.

As explained later in detail, the reversible table motor 4 is directly coupled to the table driving unit and is sufficiently powerful to provide the required cutting and table return speed rates. The limits of table reciprocation usually are determined by electrical limit switches which are actuated by adjustable dogs or similar devices carried by the table. The arrangement is such that the length of the table strokes may be regulated in accordance with the length of the workpiece, with sufficient overtravel at opposite stroke limits to provide clearance for feeding and shifting the tool. The table motor is of the variable speed type and the limit switches are interconnected in an electrical circuit which includes regulating means for determining the cutting speeds and table return speeds in response to operation of the limit switches at the limits of table reciprocation.

Due to the great mass of the table and its workpiece, and the high rates of table motion, the reversal of the table at the limits of its motion produces heavy impact forces which necessarily are absorbed by the table driving system. In addition to the impact forces, the cutting pressure, that is, the resistance developed between the workpiece and cutting tool, imposes heavy loads upon the table driving system as the table advances through its cutting stroke. The downward pressure upon the workpiece and table during the cutting stroke also imposes heavy bearing pressures on the V bearings which support the table relative to the bed.

In order to cushion the table driving unit against the impact forces incident to table reversal, the components of the driving system are provided with plain bearing surfaces which retain an oil film to provide a lubricating and shock absorbing action, an oil circulation system being provided for this purpose, as explained later in detail. The circulating system also floods the V bearings of the table and bed to provide an unbroken oil film between these surfaces to minimize friction and wear. Because of the amount of energy transmitted to the table through the table drive unit, heat naturally is generated within the unit. In order to dissipate this heat, the oil which floods the V bearings, flows through the bed and finally reaches a sump in cooled condition; from the sump the lubricant is passed through the table drive unit as a coolant before being recirculated to the bed ways.

*Table Drive System*

Figure 2:
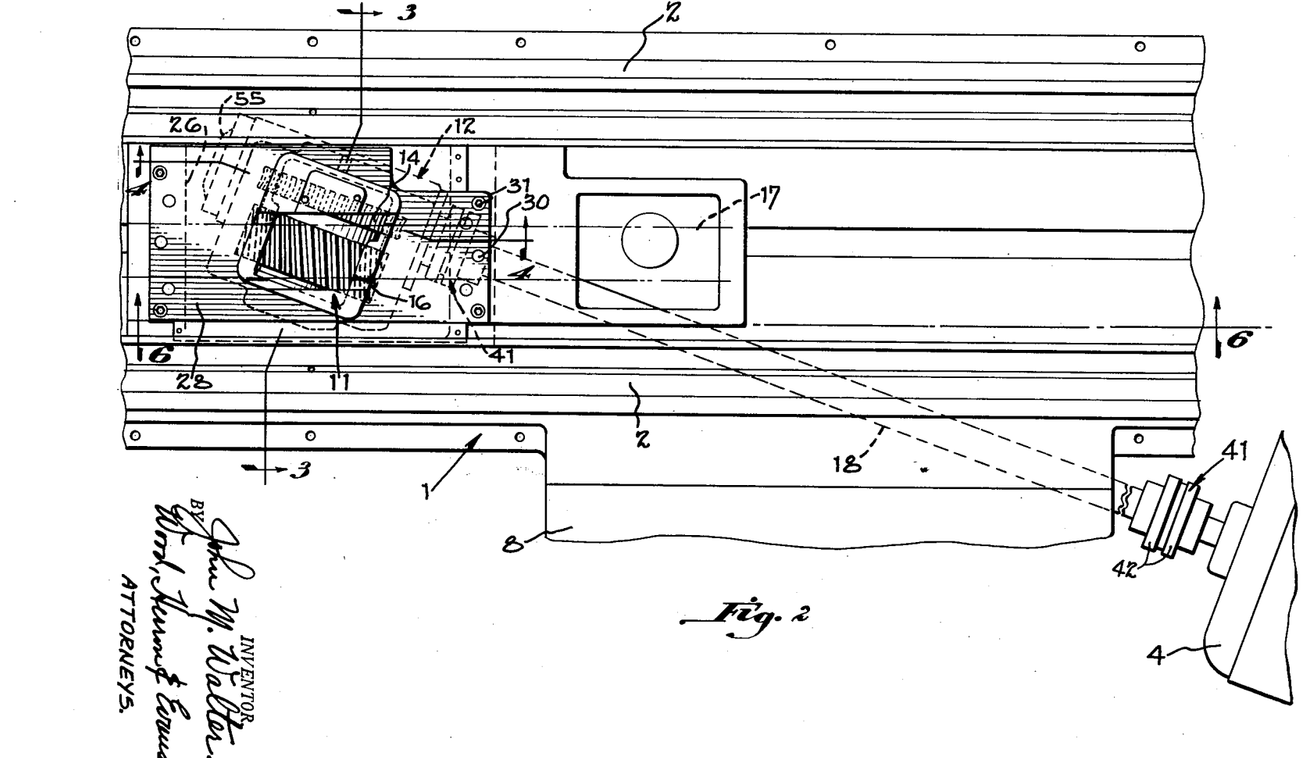
FIGURE 2 is a fragmentary top plan view of the planer bed with the table removed, generally illustrating the table driving system in relation to the bed.

As shown in FIGURE 2, the table driving system, as indicated generally at 11, is enclosed within a gear box or case 12 located at a midpoint along the length of the bed 1 and transversely between the V bearings 2, and comprises a self-contained unit. Described generally with reference to FIGURES 3 and 4, the table transmission system comprises a worm 13 journalled in the gear case 12 and meshing with a worm wheel 14 rotatably journalled upon a stationary shaft 15, which is mounted in the gear case 12. The worm wheel 14 is joined to a helical rack pinion (or bull gear) 16 which meshes with a helical rack 17 attached to the undersurface of the table 3.

The worm 13 is in driving connection with the reversible table motor 4 by means of a power shaft 18 extending at an angle through one side of the bed to the motor 4, which is mounted in the angle between the bed 1 and column 8 in accordance with the prior Walter Patent No. 2,504,366 (FIGURE 2). As described in detail later, the table drive system 11 provides a speed reduction drive, such that the motor and drive shaft operate at relatively high speed but under low torque in reciprocating the table.

Figure 3:
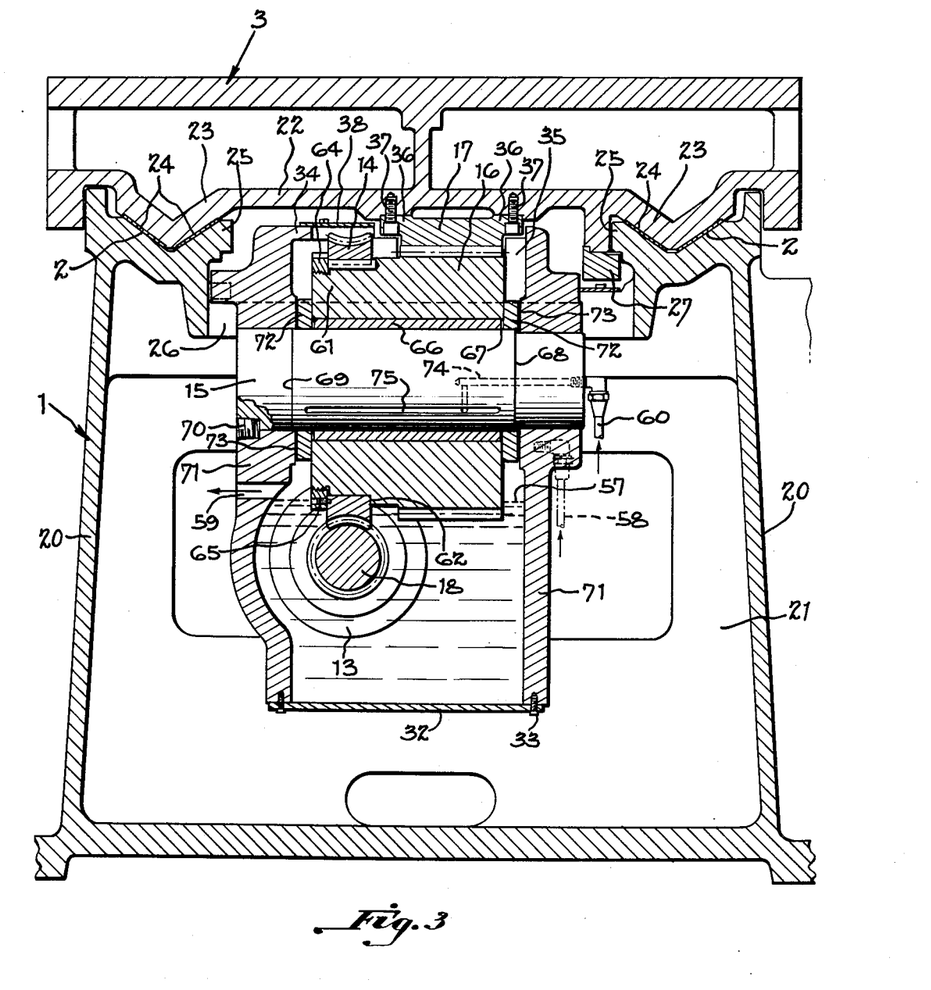
FIGURE 3 is a cross sectional view taken along line 3—3 of FIGURE 2, detailing the self-contained table driving system.

Described generally with reference to FIGURE 3, the bed 1 comprises a rigid casting including side walls 20—20 reinforced by a series of transverse ribs 21, and having a top wall 22 including the V bearings 2 at opposite sides. In the present example, the table 3 comprises a box section and includes ways 23—23 having laminated plastic bearing plates 24 attached thereto and in bearing engagement with the V bearings of the bed. Each V bearing 2 includes an inwardly projecting lip 25 and at least one side of the bed is provided with a gib 27 in sliding contact with the lip for holding the table in bearing engagement with the ways, with the bull gear 16 properly meshing with the pinion 17. As shown in FIGURE 2, the gear case 12 depends downwardly through an opening 26 which is formed in the top wall 22 between the V bearings 2—2.

Figures 4, 5:
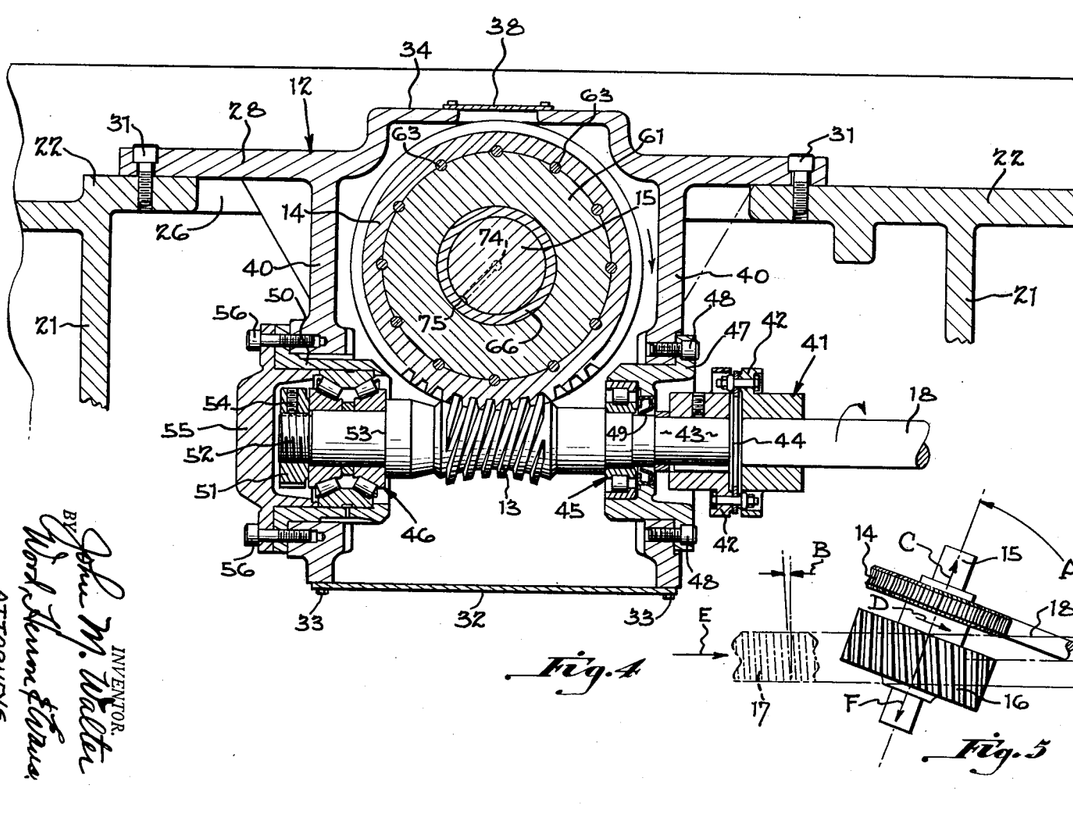
FIGURE 4 is a fragmentary longitudinal section taken along line 4—4 of FIGURE 2, further detailing the driving system.
FIGURE 5 is a diagrammatic view taken from FIGURE 2, showing the operating characteristics of the driving system.
Figure 6:
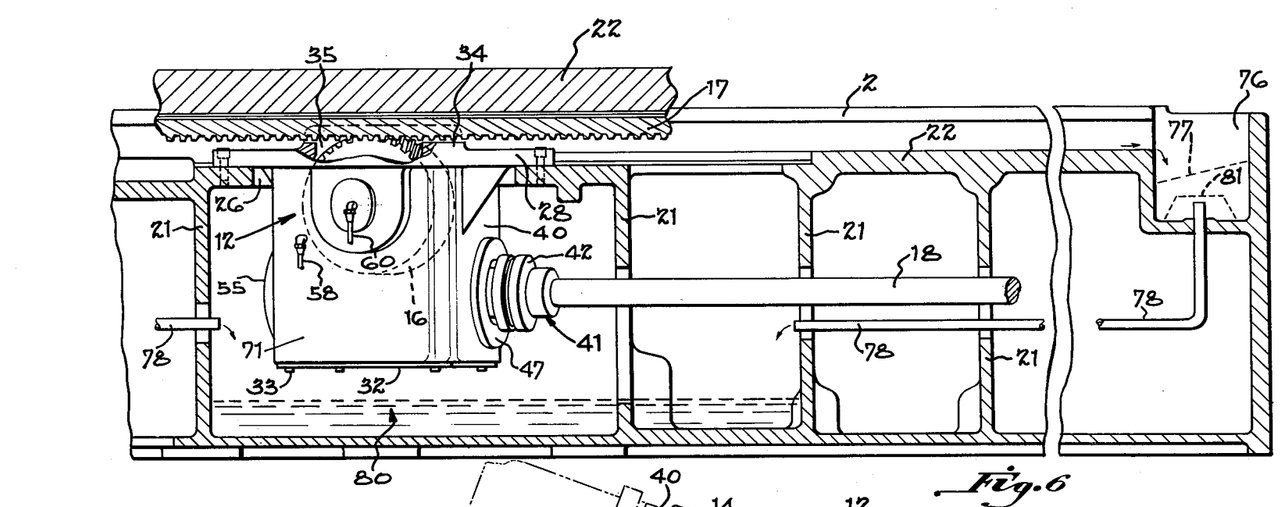
FIGURE 6 is a fragmentary longitudinal section taken along line 6—6 of FIGURE 2, showing the table drive unit and its driving connection with the table rack.

As best shown in FIGURES 4 and 6, the gear case 12 includes a top flange 28 which overlies the top wall 22 of the bed at opposite ends of opening 26. The flange 28 is located precisely in position by means of dowel pins 30 (FIGURE 2) and is held rigidly in place by cap screws 31 passing through the flange and into threaded engagement with the top wall 22. The gear case proper is generally rectangular and is disposed in an angular position with respect to its flange 28, the angle of the box corresponding with the angle of power shaft 18, as indicated in broken lines in FIGURE 2.

The stationary shaft 15 of the bull gear extends across the gear box on an axis substantially at right angles to the power shaft 18, as indicated diagrammatically in FIGURE 5. The bull gear shaft 15 accordingly resides at an acute angle to the longitudinal path of travel of the table, as indicated at A in FIGURE 5. The angulation of the bull gear shaft, combined with the helical rack and pinion teeth, substantially counterbalances the end thrusts which are developed by the worm and wheel drive during forward and return movement of the table, as explained later in detail.

The gear case preferably comprises a one-piece casting, suitably machined and having its lower end sealed off by a closure plate 32, secured by screws 33 (FIGURES 3 and 4). The gear case includes an upper portion 34 projecting above the flange 28 (FIGURES 2 and 6) which includes an opening 35 extending parallel with and somewhat wider than the rack 17. As viewed in FIGURE 3, the rack teeth project downwardly through the opening 35 and into meshing engagement with the teeth of the bull gear. The rack is provided with flanges 36—36 at opposite sides which clear the side edges of the opening 35. A series of cap screws 37 pass through these flanges and into threaded engagement with the table and secure the rack rigidly to the table. A closure plate 38 adjacent the rack is secured to the gear casing and overhangs the upper portion of the worm wheel.

As best shown in FIGURE 4, the worm 13 is journalled between the end walls 40—40 of the gear case and is in driving connection with the power shaft 18 through a flexible coupling, indicated generally at 41. The coupling is a commercial type comprising, in general, opposed spiders 42—42 keyed respectively to the power shaft 18 and worm shaft 43 and interconnected through a flexible ring 44. The coupler permits the power shaft 18 to be misaligned with respect to the axis of the worm shaft 43 without imposing any strain on the parts. The outer end of the power shaft 18 is connected to the motor shaft through a similar coupling, also indicated at 41 (FIGURE 2).

The opposite ends of the worm shaft 43 are supported by roller bearings indicated generally at 45 and 46 in FIGURE 4. Roller bearing 45 comprises an inner race interfitting a counterturned portion of the worm shaft and having an outer race seated in a flanged cup 47. Cup 47 interfits an opening in the end wall 40 and is secured in place by cap screws 48 threaded into the end wall. The cup includes an oil seal 49 embracing the shaft 43 in an outboard position.

The bearing 46 absorbs the end thrusts and comprises a double row of rollers tapering toward one another and having inner faces embracing the counterturned portion of the worm shaft. The outer race of the bearing is fitted into a flanged sleeve 50 seated in the opposite end wall 40. An adjustment nut 51 is screwed upon the threaded end 52 of the worm shaft and clamps the inner races against the shoulder 53 delineated by the counterturned portion. The nut is locked in adjusted position by a set screw 54. The outer race is clamped in place by a closure cap 55 which interfits the sleeve 50, the two members being secured in place by cap screws 56 threaded into the end wall 40.

The worm 13 is machined as an integral part of shaft 43 and has a left hand helix. As viewed from the side (FIGURE 4) the worm is generally of hour glass shape corresponding to the worm wheel circle and providing threaded engagement with the worm wheel teeth for its full length, to provide maximum strength and durability.

The bottom portion of the gear case (FIGURE 3) forms an oil reservoir which maintains an oil level as indicated at 57. The teeth of the worm wheel and bull gear thus pass through the oil bath, such that the bull gear supplies lubricant to the teeth of rack 17. As noted earlier, the lubricant bath also acts as a coolant to dissipate the heat generated in the gear case. The cooled lubricant is supplied in a continuous stream under low pressure by way of a conduit 58 which leads from the circulatory system, and the oil level 57 is maintained by an overflow passageway 59 formed in the gear case. After flowing from the gear case, the oil enters a sump and is recirculated to lubricate the V bearings of the bed and table. Lubricant is supplied under pressure to the bull gear shaft 15 by way of conduit 60 (FIGURE 3). Conduit 60 is also interconnected in the circulatory system to supply lubricant continuously to the bull gear bearing surfaces.

The worm wheel 14 is rigidly mounted on the hub 61 of the bull gear, the hub being counterturned to provide a shoulder 62 against which the worm wheel is seated (FIGURE 3). The worm wheel is keyed to the bull gear by a series of pins 63 (FIGURE 4) which are pressed into bores drilled at the meeting line of the bull gear hub and worm wheel, such that the pins key the two parts together. The worm wheel is clamped against the shoulder 62 by a ring 64 (FIGURE 3), which is threaded upon the end of hub 61. The ring is locked permanently in place by a set screw 65 passing through ring 64.

The bull gear is loosely journalled upon the shaft 15 through an anti-friction bushing 66, preferably formed of bronze, with clearance for an oil film between the bearing surfaces of the shaft and bushing. The opposite ends of the bushing terminate a slight distance inwardly from the opposite sides of the bull gear so as to provide the annular oil passageways 67—67. The bull gear shaft 15 is provided with increasing diameters delineated by the shoulders 68 and 69 for insertion through the walls of the gear case from left to right. The shaft is locked securely in place by a threaded plug 70 which is engaged in a threaded bore formed in the shaft and side wall 71 of the gear case. The plug locks the shaft against axial displacement and against rotation.

Although the end thrusts are substantially counterbalanced, the shaft 15 is provided with a pair of thrust washers 72—72 (FIGURE 3) interposed between the side walls 71 at opposite sides of the bull gear to absorb residual thrusts. These thrust washers are loosely interfitted to provide a slight lubricant clearance, as indicated at 73. The lubricant, which is supplied under pressure by conduit 60, advances through an axial bore 74 of shaft 15, which communicates with a shallow groove 75 extending lengthwise along the shaft 15 and open to the bearing surface of bushing 66. The oil supplied under pressure by conduit 60 thus floods the bearing surfaces of the bull gear and flows outwardly at opposite sides of the bull gear, into the annular oil passages 67, and into the flat bearing surfaces provided by the thrust washers. The oil then flows by gravity to the reservoir in the lower portion of the gear case for recirculating.

As explained later, the oil which is supplied to the conduits 58 and 60 is filtered to remove any foreign substance and forms an unbroken film between the plain bearing surfaces. This oil film prevents wear and also acts as a shock absorber with respect to the heavy thrusts which are developed during table reversal. The teeth of the bull gear, which pass through the lubricant bath, constantly supply fresh oil to the teeth of the rack 17 during forward and reverse rotation so as to reduce wear and also to provide a smooth tooth action.

Operation

As seen in FIGURE 5, the teeth of the rack 17 are inclined an amount to oppose the side thrust on the rack (and table) produced by the bull gear teeth. Since the bull gear rotates about an axis which is inclined to the path of travel of the rack, a frictional force is created. The angle B indicated in FIGURE 5, is equal to the angle of friction.

The intermeshing helical rack and bull gear teeth provide an exceptionally smooth driving action by reason of the tooth form and helical disposition. During rotation of the bull gear, each tooth provides a contact line having a substantial length, which moves across the face of the rack tooth as the table is advanced. By reason of the helical action of the teeth, there is provided an overlapping action as the successive teeth mesh, such that two or more gear teeth are in mesh with the rack teeth at all times for smoothness. In addition, the tooth form provides a low pressure angle which cuts down the forces acting upwardly with respect to the rack and table.

As viewed in FIGURE 4, the worm 13 has a left hand helix; accordingly, the worm wheel rotates in the direction indicated by the arrow when the power shaft 18 rotates toward the right, as indicated. By reason of the cutting resistance of the table, end thrusts act upon the worm during the forward and return strokes of the cable; these thrusts are resisted by the double row thrust bearing 46. In addition, the bearing resists impact forces which are developed upon reversal at the limits of table reciprocation, especially when operating at a high rate of table motion.

The rotation of the worm relative to the teeth of the worm wheel naturally generates frictional resistance, tending to shift the worm wheel axially along the shaft 15 in the forward and reverse direction of rotation of the worm. This axial thrust also tends to develop impact forces which act along the axis of shaft 15 at the moment of table reversal. However, as noted earlier, the present structure is arranged to substantially balance out such axial thrust forces so as to reduce wearing of the parts and to provide a smooth running machine.

Referring now to FIGURE 5, which shows the concurrent forces acting upon the components, the arrow C indicates the direction of the frictional thrust during right hand rotation of the power shaft 18, corresponding to FIGURE 4. Rotation of the power shaft 18 in the indicated direction drives the worm wheel and bull gear in the direction indicated at D, shifting the table toward the right as indicated by the arrow E.

By reason of the angular disposition of the bull gear shaft, combined with the helical rack and bull gear teeth, the frictional force acting upon the worm wheel along the axis of the shaft, is substantially counterbalanced by forces acting on the bull gear in the opposite direction, as described below. Bearing in mind that the worm wheel and bull gear are secured together as a single component, the frictional force indicated at C also acts upon the bull gear. However, resistance to rotary motion acts upon the bull gear by reason of its meshing engagement with the rack teeth as the bull gear forces the table toward the right. As a consequence of this resistance, thrust forces act upon the bull gear along the axis of the shaft in the direction indicated at F, the magnitude of force being determined by the angle A of the shaft. The axial force indicated at F is substantially equal to the opposite force C; any residual thrust acting upon the parts is absorbed by one of the thrust washers 72 as indicated previously.

During left hand table motion, in the direction opposite to that indicated in FIGURE 5, the power shaft, rotating in the left hand direction, tends to force the worm wheel axially in the direction opposite to that shown by the arrow C. In this case, the turning resistance acting upon the bull gear is opposite to that indicated at D; hence, axial forces act upon the bull gear in a direction opposite to that indicated at F. This force component substantially counterbalances the frictional thrust of the worm during left hand table motion. Accordingly, the thrust forces are substantially counterbalanced during reciprocation of the table in both directions. As noted earlier, the inclined rack teeth and bull gear teeth also balance out any side thrusts which tend to act upon the rack and table through operation of the driving system.

Since the worm and worm wheel are both journalled within the gear case 12, the forces incident to the reciprocation of the table, are confined within the gear case itself as a self-contained unit, while the reaction forces developed through table reciprocation are absorbed by the top flange 28, through its attachment to the bed of the machine.

Lubrication System

As best shown in FIGURE 6, the oil which drains from the ways 2—2 of the bed, flows by gravity to respective settling basins 76—76 formed at opposite ends of the bed. Each basin is covered by a strainer, indicated diagrammatically at 77 for separating solid particles from the lubricant. A return conduit 78 projects upwardly through the bottom of each settling basin and extends to the oil sump, indicated generally at 80, which is formed within the bed intermediate its length. The gear case 12 resides above the sump, such that the oil from the overflow passageway 59 flows directly into the sump. Each settling basin includes a second strainer 81 surrounding the upper end of the return conduit to remove the finer particles which may be entrained in the oil.

Figure 8:
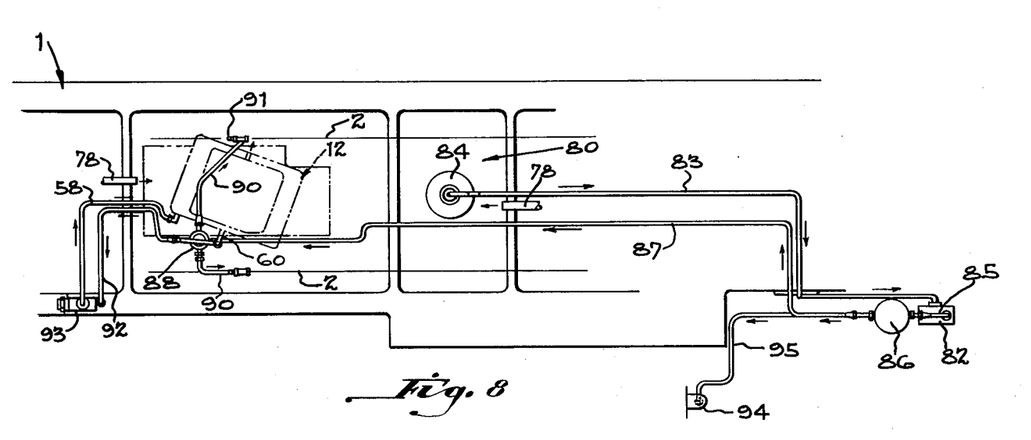
FIGURE 8 is a diagrammatic plan view of the planer bed, showing the lubrication system which supplies circulating lubricant to the table slide ways and table driving unit.
Figure 9:
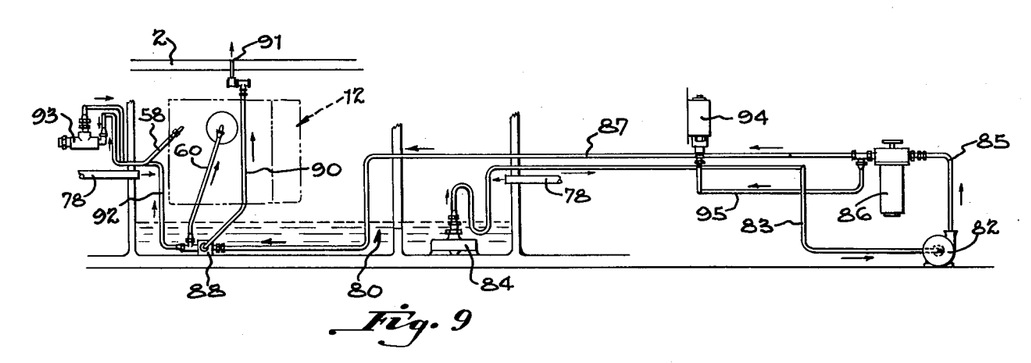
FIGURE 9 is a diagrammatic side view, as projected from FIGURE 8, further illustrating the lubrication system.

Referring to FIGURES 8 and 9, the oil is circulated by a motor driven oil pump indicated at 82, which is interconnected with the sump by way of an intake conduit 83. This conduit includes an oil strainer 84 mounted in the lower portion of the sump 80. From the pump, oil is supplied under pressure by way of conduit 85 to a filter 86 and from the filter by way of conduit 87 to a terminal block 88.

As viewed in FIGURE 8, branch lines 90—90 extend upwardly from the terminal block to the V bearings 2 at opposite sides of the bed. These conduits communicate with oil outlets 91—91 open to the underside of the table. The bearing surfaces of the table which embrace the V bearings are provided with respective grooves (not shown) which are substantially coextensive with the table to provide oil under pressure throughout the length of the table bearing surfaces. The table includes internal passageways (not shown) which project small streams of oil from opposite ends of the table upon the V bearings to wash grit and dirt from them in advance of the table. The table is also provided with wipers embracing the bed ways for grit removal during reciprocation of the table. After draining from the ways, the lubricant flows along the top of the bed and back to the sump by way of the settling basin 76 and return conduits 78. The conduit 60 which leads to the bull gear shaft, as previously described, is also interconnected with the terminal block 88 to supply lubricant under pressure to the shaft.

As noted earlier, the oil is supplied at low pressure to the reservoir of the gear case by way of the conduit 58. For this purpose, a conduit 92 branches from the terminal block and extends to a pressure relief valve 93. The conduit 58 which leads to the gear case reservoir is in communication with the pressure relief valve 93. According to this arrangement, oil is supplied under predetermined pressure to the bull gear and table ways in accordance with the setting of the relief valve. Excess oil which bypasses under back pressure through the relief valve passes under low pressure to the gear case for cooling purposes, as explained earlier.

In order to protect the machine, the lubricating system is provided with a pressure-responsive switch 94, which is interconnected by way of branch conduit 95 with the pressure conduit 87. This switch is interconnected in the main control circuit of the planing machine and is arranged to decommission the electrical circuit when the pressure in the lubricating system falls below a predetermined setting. The purpose of this arrangement is to prevent damage to the machine through insufficient lubrication.

Modified Table Drive Unit

Figure 7:
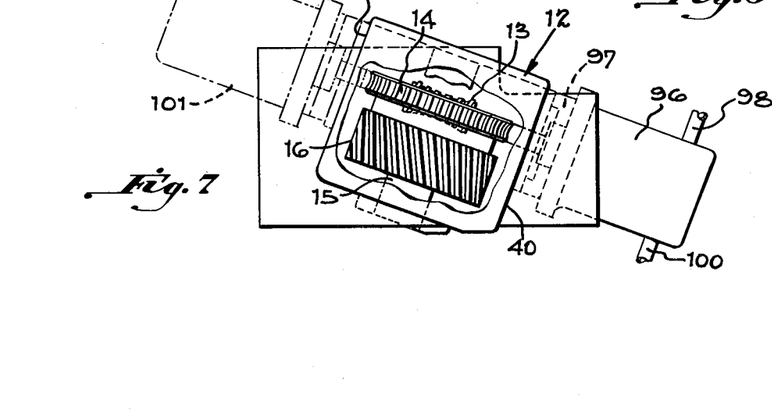
FIGURE 7 is a top plan view of the table driving unit showing a modified version wherein power is supplied by a hydraulic motor mounted within the bed of the machine, as distinguished from the outboard electric motor drive shown in FIGURES 1 and 2.

The modified structure shown in FIGURE 7 employs a table transmission and gear case which is identical to that described above, except that the unit is powered by a hydraulic motor which is coupled directly to the worm 13. As shown in full lines, the motor 96 is provided with a mounting collar 97 which is attached directly to the end wall 40 of the gear case. The hydraulic motor is reversible and hydraulic fluid is supplied for forward and reverse rotation by the hydraulic conduits 98 and 100. These conduits are interconnected with a hydraulic pressure system having suitable reversing valves to control the table strokes. The smaller size of the hydraulic motor in relation to horsepower makes it possible to mount the motor within the bed, thereby to provide a more compact machine.

In cases where there is insufficient space for locating the hydraulic motor in the position shown in full lines, the motor position may be reversed as shown in broken lines at 101. In this event, the position of the worm 13 in the gear case is reversed from the position shown in FIGURE 4 for connection to the motor.

Having described my invention, I claim:

1. A driving system for a metal-working planer having a bed, and having a table mounted for reciprocation along the bed, said driving system comprising a bull gear mounted for rotation about an axis which is disposed at an acute angle to the path of motion of the table, a rack mounted on said table and in mesh with said bull gear, said rack and bull gear having helical teeth, a worm wheel mounted on said bull gear for rotating the same, a worm meshing with the worm wheel, and reversible power means in driving connection with said worm for reciprocating the table, the axis of rotation of the bull gear and worm wheel adapting the bull gear to develop axial thrust forces which substantially counteract axial thrust forces imposed upon the worm wheel by said worm during forward and reverse rotation thereof.

2. A driving system for a metal-working planer having a bed, and having a table mounted for reciprocation along the bed, said driving system comprising a bull gear, means mounting the bull gear for rotation within the bed about an axis which is disposed at an acute angle to the path of motion of the table, a rack mounted on the underside of said table and in mesh with said bull gear, said rack and bull gear having helical teeth, a worm wheel connected to said bull gear for driving the same, a worm shaft journalled for rotation within the bed and having a worm meshing with the worm wheel, and reversible power means in driving connection with said worm shaft for reciprocating the table under power, the axis of rotation of the bull gear and worm wheel relative to the path of motion of the table adapting the bull gear to develop thrust forces which substantially counterbalance axial thrust forces imposed upon the worm wheel by said worm during forward and reverse rotation thereof.

3. A driving system for a metal-working planer having a bed and having a table mounted for reciprocation in a longitudinal path along the bed, said driving system comprising, a bull gear shaft mounted within said bed and extending at an acute angle relative to the longitudinal path of motion of the table, a bull gear mounted for rotation relative to the axis of said shaft, a worm wheel connected to the bull gear for rotation therewith, a rack mounted on said table and in mesh with said bull gear, a worm shaft journalled for rotation within the bed, a worm on said shaft meshing with said worm wheel, and a reversible power motor in driving connection with said worm shaft for shifting said table in forward and return directions, the angular disposition of said bull gear shaft adapting the bull gear to develop thrust forces which substantially counterbalance axial thrust forces which are imparted to the worm wheel by said worm during forward and reverse rotation thereof, said rack and bull gear having meshing helical teeth adapted to balance out side thrust forces which are generated as a result of the angular disposition of the bull gear shaft, whereby the table is free of side thrusts during reciprocation thereof.

4. A driving system for a metal-working planer having a bed and having a table mounted for reciprocation along the bed, said driving system comprising, a bull gear mounted within the bed for rotation about an axis which is disposed at an angle to the path of motion of the table, a rack mounted on the underside of said table and in mesh with said bull gear, said rack and bull gear having helical teeth, a worm wheel connected to the bull gear for driving the same, a worm shaft journalled in said bed for rotation about an axis substantially at right angles to the axis of rotation of said bull gear, a worm on said shaft meshing with said worm wheel, and a reversible power motor in driving connection with said worm shaft for shifting said table in forward and return directions, the direction of the helix of said worm, the helix of the bull gear teeth and the angular axis of rotation of said bull gear being related to one another, whereby the bull gear develops thrust forces tending to shift the bull gear and worm wheel axially during forward and return reciprocation of the table, said forces substantially counterbalancing axial thrust forces which are frictionally imparted to the worm wheel by said worm during forward and reverse rotation thereof.

5. A self-contained driving system for a metal-working planer having a bed and having a table mounted for reciprocation in a longitudinal path along the bed, said driving system comprising, a gear case mounted within the bed, a bull gear shaft mounted in said gear box and extending at an angle relative to the longitudinal path of motion of the table, a bull gear mounted for rotation about the axis of the bull gear shaft, a rack mounted on the underside of said table and in mesh with said bull gear, said bull gear and rack having helical teeth, a driven wheel connected to the bull gear for driving the same, a power shaft journalled in said gear case, a driving element on said power shaft meshing with said driven wheel, and a reversible power motor in driving connection with said power shaft for shifting said table in forward and return directions, said driving element adapted to impart axial thrust forces to the driven wheel during forward and reverse rotation thereof, the angular disposition of the said bull gear shaft adapting the bull gear to develop thrust forces tending to shift the bull gear and driven wheel axially relative to the bull gear shaft during forward and return reciprocation of the table, said forces substantially counterbalancing axial thrust forces which are imparted to the driven wheel by said driving element during forward and reverse rotation thereof, said rack and bull gear having meshing helical teeth adapted to balance out side thrust forces which are generated as a result of the angular disposition of the bull gear shaft, whereby the table is free of side thrusts during reciprocation thereof.

6. A self-contained driving system for a metal-working planer having a bed and having a table mounted for reciprocation in a longitudinal path upon the bed, said driving system comprising, a gear case mounted in said bed, a bull gear shaft mounted in said gear case and disposed at an acute angle relative to the longitudinal path of motion of the table, a bull gear rotatably journalled on said shaft, a rack mounted on the table and meshing with the bull gear for reciprocating the table, said bull gear and rack having helical teeth, said bull gear including a hub, a worm wheel keyed upon the hub of the bull gear, a worm shaft journalled for rotation in said gear case about an axis substantially at right angles to the axis of said bull gear shaft, a worm on said worm shaft meshing with said worm wheel, and a reversible table motor in driving connection with the worm shaft for rotating said worm in forward and reverse directions, thereby to reciprocate said table, the angular disposition of said bull gear shaft adapting the bull gear to develop thrust forces which substantially counteract axial thrust forces which are imposed upon the worm wheel through frictional resistance with the worm during forward and reverse rotation thereof.

7. A self-contained driving system for a metal-working planer having a bed and having a table mounted for reciprocation in a longitudinal path upon the bed, said driving system comprising, a bull gear shaft mounted in said bed and disposed at an acute angle relative to the longitudinal path of motion of the table, a bull gear mounted for rotation about the axis of said shaft, driving means interconnecting the table and bull gear for reciprocating the table, a worm wheel connected to the bull gear for driving the same, a worm shaft journalled for rotation in said bed about an axis substantially at right angles to said bull gear shaft, a worm on said shaft meshing with said worm wheel, a power shaft connected to said worm shaft, said power shaft extending outwardly from the worm through the bed at an acute angle to the longitudinal path of table motion and a table motor mounted in an outboard position relative to the bed and in driving connection with the outer end of the power shaft for rotating said worm in forward and reverse directions, thereby to reciprocate said table.

8. A self-contained driving system for a metal-working planer having a bed and having a table mounted for reciprocation in a longitudinal path upon the bed, said driving system comprising, a bull gear shaft mounted within said bed and disposed at an angle which is acute to the longitudinal path of motion of the table, a bull gear journalled for rotation about the axis of the bull gear shaft, a rack extending longitudinally of the bed and meshing with the bull gear, said rack and bull gear having intermeshing helical teeth, the helix of the bull gear teeth being related to the acute angle of said bull gear shaft, whereby the intermeshing rack and bull gear teeth are disposed substantially at right angles to the path of table motion, a driven wheel connected to said bull gear for driving the same, a drive shaft rotatably journalled within the bed, a driving element on said shaft meshing with said driven wheel, and power means connected to said drive shaft for rotating the same in forward and reverse directions, thereby to reciprocate the table upon the bed, the angular disposition of the bull gear and shaft adapting the bull gear to develop thrust forces which act along the axis of said bull gear shaft in forward and reverse directions during forward and reverse reciprocations of the table, said driven element adapted to impart axial thrust forces to the driven wheel which are substantially counterbalanced by the axial thrust forces acting upon the bull gear during forward and reverse reciprocations of the table, the said helical teeth of the rack and bull gear adapted to balance out side thrust forces which are generated as a result of the acute angular disposition of the bull gear shaft, whereby the table is free of side thrust during reciprocation thereof.

9. A self-contained driving system for a metal working planer having a bed and having a table mounted for reciprocation in a longitudinal path upon the bed, said driving system comprising, a gear case mounted in said bed, a bull gear shaft mounted in said gear case and disposed at an angle which is acute to the longitudinal path of motion of the table, a bull gear rotatably journalled on the bull gear shaft, a rack extending longitudinally of the bed and meshing with the bull gear, said rack and bull gear having intermeshing helical teeth, the helix of the bull gear teeth being related to the acute angle of said bull gear shaft, whereby the intermeshing rack and bull gear teeth are disposed substantially at right angles to the path of table motion, a worm wheel keyed to said bull gear along one side thereof, a worm wheel shaft rotatably journalled in said gear case, a worm on said shaft meshing with said worm wheel, and power means connected to said worm wheel shaft for driving the same in forward and reverse directions, thereby to reciprocate the table upon the bed, the angular disposition of the bull gear shaft adapting the bull gear to develop thrust forces which act along the axis of said bull gear shaft in forward and reverse directions during forward and reverse reciprocations of the table, the helix of said worm being related to the angle of said bull gear shaft to impart axial thrust forces to the worm wheel which are substantially counterbalanced by the axial thrust forces acting upon the bull gear during forward and reverse reciprocations of the table.

10. A table driving mechanism for a metal-working planer having a bed, a table mounted for reciprocation along the bed, and a system for circulating lubricant to the bearing surfaces of the table and bed, said bed having a lubricant sump for collecting the lubricant which drains from the bearing surfaces of the bed for recirculation by said system, said table driving mechanism comprising, a gear case mounted in said bed above said lubricant sump, a bull gear shaft mounted in said gear case and disposed on an angle which is acute to the path of motion of the table, a bull gear rotatably journalled on said bull gear shaft, a rack extending longitudinally of the table and in mesh with said bull gear, said rack and bull gear having helical teeth, a worm wheel mounted on said bull gear for driving the same, a worm shaft rotatably journalled in said gear case, a worm on said shaft meshing with said worm wheel and power means connected to said worm shaft for driving the worm in forward and reverse directions, thereby to reciprocate the table, the helix of said worm and the angular disposition of the bull gear being related and adapting the bull gear to develop axial thrust forces which substantially counterbalance the axial thrust forces acting upon the worm wheel through forces generated by rotation of the worm, said lubricant supply system including means for advancing lubricant from said sump to the gear case for circulating lubricant therethrough, whereby the said circulating lubricant acts as a coolant for carrying off heat which is generated through operation of the driving mechanism.

11. A table driving mechanism for a metal-working planer having a bed, a table mounted for reciprocation in a longitudinal path upon the bed, and a system for circulating lubricant to the bearing surfaces of the table and bed, said bed having a lubricant sump intermediate the length thereof, whereby lubricant is supplied to the bearing surfaces of the table and bed and is adapted to drain back along the bed to said sump for recirculation by the system, said table driving mechanism comprising, a gear case mounted in said bed above said lubricant sump, a bull gear shaft mounted in said gear case and disposed on an angle which is acute to the longitudinal path of motion of the table, a bull gear rotatably journalled on said bull gear shaft, a rack extending longitudinally of the table and in mesh with said bull gear, a worm wheel mounted on said bull gear for driving the same, a worm shaft rotatably journalled in said gear case beneath said worm wheel, a worm on said shaft meshing with said worm wheel, power means connected to said worm shaft for driving the worm in forward and reverse directions, thereby to reciprocate the table, the helix of said worm and the angular disposition of the bull gear being related and adapting the bull gear to develop axial thrust forces which substantially counterbalance the thrust forces acting upon the worm wheel through friction generated by rotation of the worm, said lubricant system including conduit means in communication with the gear case for advancing lubricant from said sump to the gear case, said gear case having an outlet passageway disposed on a plane above the worm to maintain a lubricant level in a gear case above said worm, whereby lubricant is circulated through the gear case and drains back to the sump to carry away heat which is generated through operation of the driving mechanism, said lubricant system adapted to cool the heated lubricant during drainage thereof from the bearing surfaces of the bed and table back to the sump.

12. A table driving mechanism for a metal-working planer having a bed, a table mounted for reciprocation in a longitudinal path upon the bed, and a system for circulating lubricant to the bearing surfaces of the table and bed, said bed having a lubricant sump intermediate the length thereof, whereby lubricant is supplied to the bearing surfaces of the table and bed and is adapted to drain back along the bed to said sump for recirculation by the system, said table driving mechanism comprising, a gear casing mounted in said bed above said lubricant sump, a bull gear shaft mounted in said gear case and disposed on an angle which is acute to the longitudinal path of motion of the table, a bull gear rotatably journalled on said bull gear shaft, a rack extending longitudinally of the table and in mesh with said bull gear, a worm wheel mounted on said bull gear for driving the same, a worm shaft rotatably journalled in said gear case beneath said worm wheel, a worm on said shaft meshing with said worm wheel, power means connected to said worm shaft for driving the worm in forward and reverse directions, thereby to reciprocate the table, the helix of said worm and the angular disposition of the bull gear being related and adapting the bull gear to develop axial thrust forces which substantially counterbalance the axial thrust forces acting upon the worm wheel through friction generated by by rotation of the worm, said lubricant supply system including a first means for advancing lubricant from said sump to the gear case for circulating lubricant through the gear case to the sump for cooling the driving mechanism, said lubricant system having a second means for advancing lubricant under pressure to the bearing surfaces of the bull gear shaft and gear for lubricating the same.

References Cited in the file of this patent

UNITED STATES PATENTS

| Re. 23,331 | Walter | Jan. 16, 1951 |
| 275,242 | Miles | Apr. 3, 1883 |
| 293,289 | Walter et al. | Feb. 12, 1884 |
| 2,215,140 | Walter | Sept. 17, 1940 |
| 2,343,504 | Gallimore | Mar. 7, 1944 |

OTHER REFERENCES

Bulletin 58, G. A. Gray Co., Cincinnati, Ohio (received May 1949), pages 9, 10 and 13 relied on. (Copy in Div. 13.)